May 5, 1936. P. A. RAICHE 2,039,626
STRIPPING APPARATUS
Filed March 14, 1934 3 Sheets-Sheet 1

May 5, 1936.　　　　　P. A. RAICHE　　　　　2,039,626
STRIPPING APPARATUS
Filed March 14, 1934　　　　3 Sheets-Sheet 3

Inventor
Paul A. Raiche
By Nathaniel Frucht
his Attorney

Patented May 5, 1936

2,039,626

UNITED STATES PATENT OFFICE 2,039,626

STRIPPING APPARATUS

Paul A. Raiche, Providence, R. I., assignor to Davol Rubber Company, a corporation of Rhode Island Application March 14, 1934, Serial No. 715,385

13 Claims. (Cl. 18—2)

My present invention relates to the manufacture of rubber articles, and has particular reference to the stripping of cured rubber articles from forms.

The stripping of rubber articles from forms has heretofore been a manual operation; in the case of small articles such as nipples and the like, the stripper uses a small hand tool which is inserted between the article and the form and pushed to force the article off. This operation leaves the removed articles scattered over the stripping table, with many of the articles turned inside out, thus necessitating sorting and turning by hand. The manual stripping for quantity production thus requires a relatively large number of workers and a substantial working area.

It is the principal object of my invention to provide an automatic stripping machine which will require a minimum of manual attention. To this end, I have devised an automatic stripper into which forms carrying rubber articles may be fed, and which automatically strips the rubber articles from the forms ready for packing, and deposits the stripped rubber articles and the forms in separate receptacles or containers.

Other objects of my invention are to increase the speed of stripping and to reduce the floor space required, thus decreasing the overhead and further lowering the cost of manufacture of the finished article.

With the above and other objects and advantageous features in view, my invention consists of a novel arrangement of parts more fully disclosed in the detailed description following, in conjunction with the accompanying drawings, and more specifically defined in the claims appended thereto.

In the drawings,—

Figure 1:
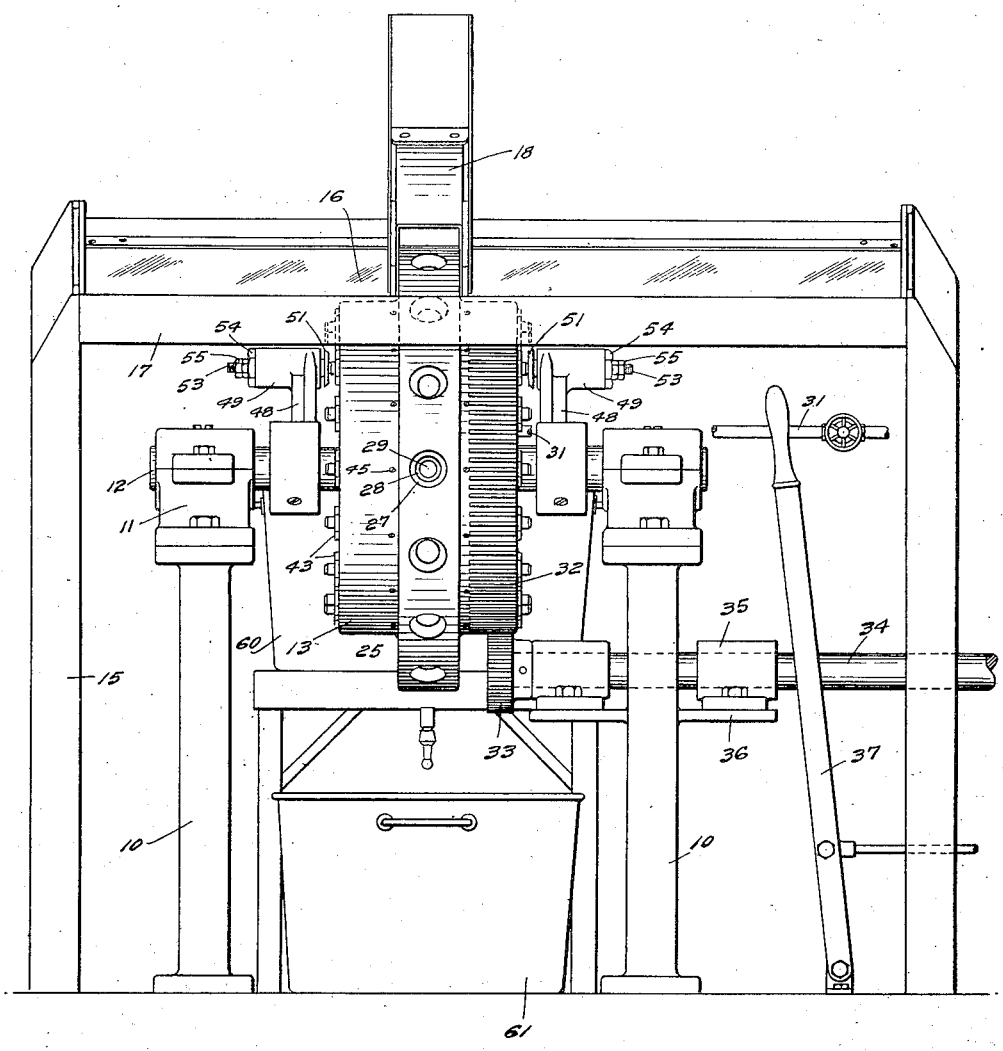
Fig. 1 is a front elevation of the novel machine.

I have found it feasible to provide an apparatus for automatically stripping articles made from resilient material from forms. For applying the invention to the stripping of nipples, I have devised an apparatus comprising a rotatable drum into which forms having rubber nipples may be fed, the forms being gripped as the drum turns and the nipples being removed therefrom by air pressure and directed into a nipple receiving receptacle; the forms are then released and permitted to drop into a form receiving receptacle. The entire procedure then becomes automatic, as the nipple-carrying forms may be automatically fed from a magazine, if desired; manual feeding, however, has been found satisfactory, as one machine attendant replaces from three to four manual strippers.

Referring to the drawings for a more detailed description of a preferred structural embodiment of the invention, the novel apparatus includes two spaced "A" type standards 10 which carry bearings 11 which in turn support a fixed shaft 12 on which the stripping apparatus 13 is rotatably mounted. A table 14 is supported on legs 15 and has a top 16 provided with a central slot to receive the stripping apparatus, the top having raised edges 17 and carrying a nipple exit chute 18 at the rear, positioned with its inner end adjacent the stripping apparatus, as shown in Fig. 2.

The novel apparatus 13 includes a hub or drum 19, fixed to the shaft and having a radial duct 20, the duct having a horizontal passageway 21 extending to the side of the base. An annular housing 22 is rotatably mounted on an L shaped bearing ring 23 secured to the drum, a side ring 24 being secured to the drum to lock the housing in place, and has a central flange portion 25 provided with a series of radial recesses 26, each recess having a bushing 27 therein, the bushings each having a tapered bottom outlet 28 which leads to a chamber 29; the chambers 29 communicate with the radial duct 20 of the drum by means of passageways 30, through a connecting port 30a which extends through the drum ring 23. The duct 21 communicates with a fixed conduit 31 which supplies air under pressure.

Figure 2:
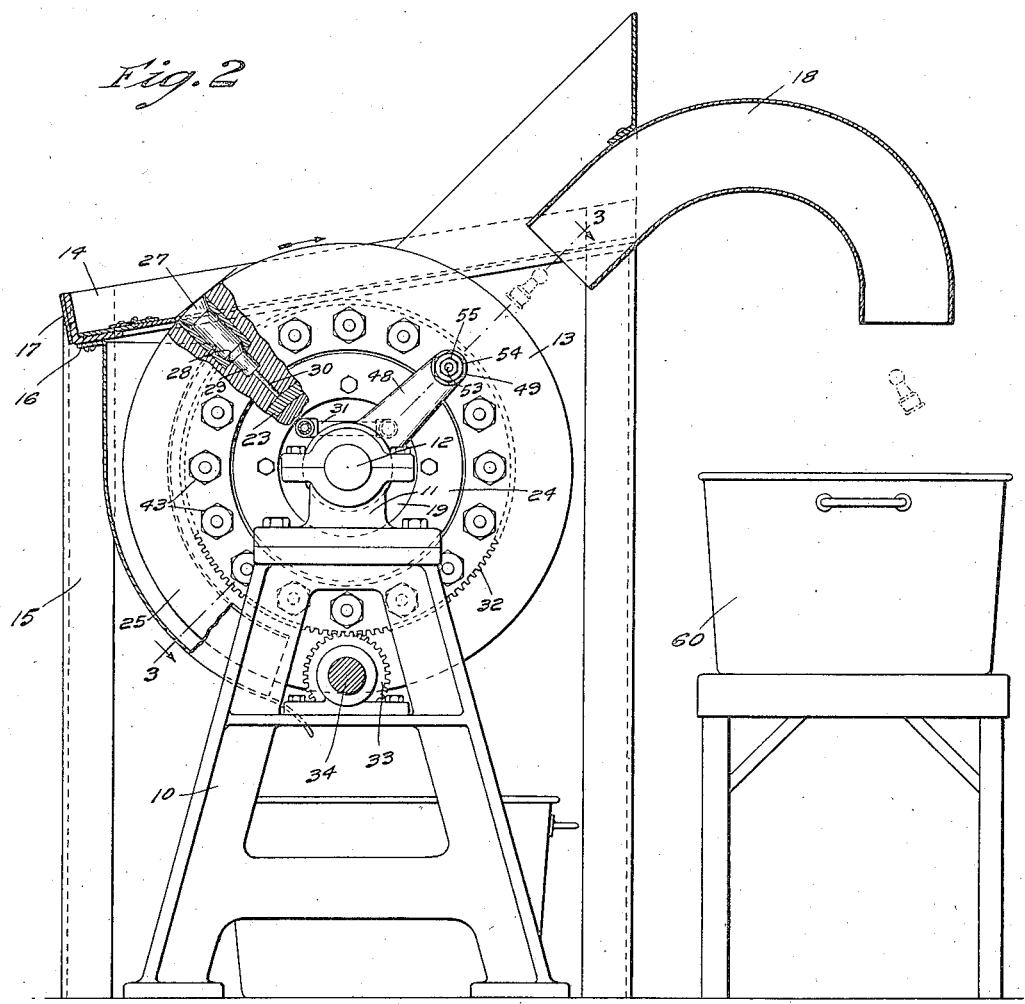
Fig. 2 is a side elevation, parts being shown in section.

The housing 22 has its periphery at one side of the flange portion formed as an annular gear 32, which meshes with a power gear 33, see Fig. 2, that is keyed to a power shaft 34 mounted in bearings 35 which are suitably supported, as on a platform 36 secured to or integral with the adjacent standard 10. A suitable power control lever 37 is provided, to operate the usual clutch, not shown, for imparting rotation to the power shaft.

The annular housing has a series of transverse openings extending therethrough in alignment with the chambers 29, each opening including an inner bore 38, and an enlarged bore 39; a holding pin 40 extends through each opening, and has a collar 41 for coaction with a compression spring 42, a lock member 43 through which the pin extends being secured to the side of the housing, as by threading. The pin 40 has a longitudinal slot 44 which receives the reduced end of a set screw 45, threaded in the housing, for preventing rotation, as the inner end 46 of the pin is convex, for the purpose hereinafter described. The pins are thus normally urged outwardly by their springs, with their outer ends 47, which are slightly beveled, projecting through the lock members 43.

Figures 3, 4, 5:
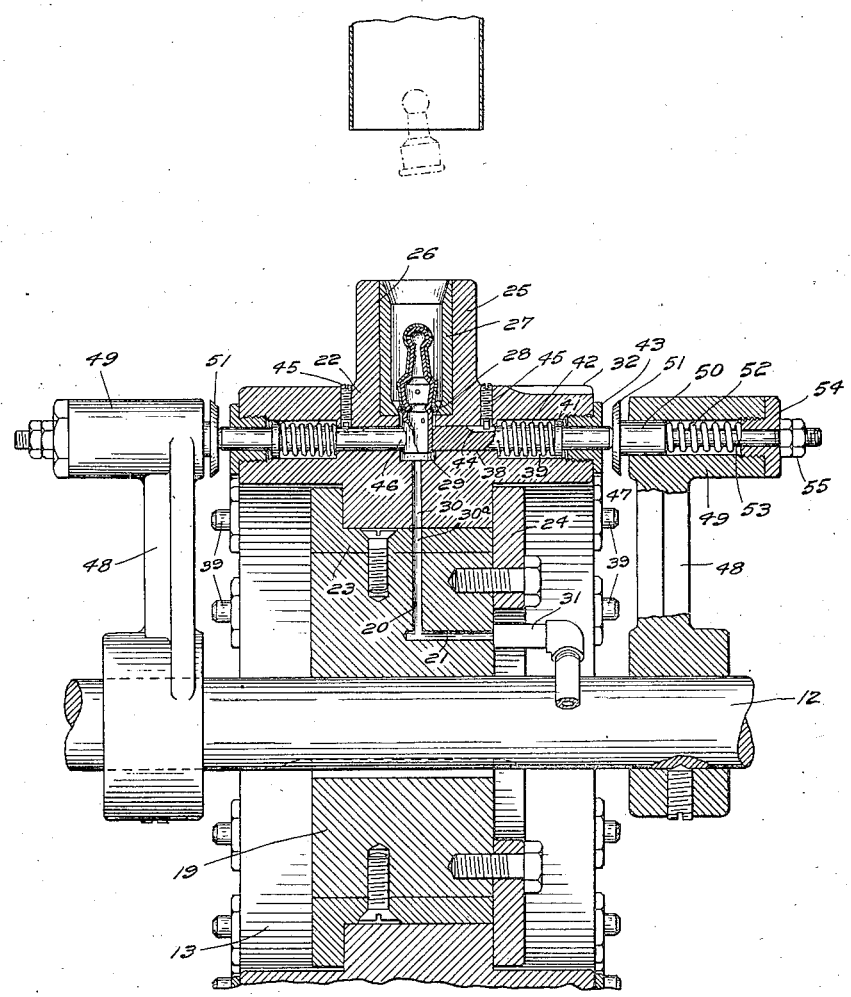
Fig. 3 is an enlarged sectional detail.
Figs. 4 and 5 are perspective views of the form and the rubber article.

Two upright arms 48 are mounted on the fixed shaft, see Fig. 3, having hubs 49 positioned adjacent the arc of movement of the pin ends 47. Each hub is transversely bored to receive a plunger 50 having a button 51, which is beveled at the pin end to slidingly receive the beveled pin ends 47. A coil spring 52 is positioned on the reduced end 53 of the plunger, this reduced end extending through a closure member 54 threaded in the bore and having lock nuts 55 secured to the end thereof. The spring 52 tends to thrust the plunger towards the pin ends, and is much heavier than the spring 42, whereby the plunger is normally stationary, but may be moved back if a pin jams, or if there is variation in the width of the forms.

The nipples 56, see Fig. 5, are brought to the stripping apparatus positioned on the forms 57, see Fig. 4, which are of metal and hollow, and have transverse air ports 58 and a depending cylindrical skirt 59. After stripping, the nipples are received in a suitable receptacle 60, and the forms drop into another receptacle 61.

The operation of the stripping apparatus may now be explained. The forms with nipples thereon are brought to the table; as the drum rotates, the operator places a form with nipple in each recess, in the position shown in Fig. 3. As the drum rotates, the outer pin ends contact the plungers, and are forced inwardly to engage the inner pin ends with the form skirts, thus gripping the form securely. The air ducts now pass into alignment with the air conduit, whereupon compressed air passes upwardly through the hollow form and out of the form ports, to blow the nipple off the form and through the chute into the nipple receptacle. Further rotation of the drum carries the pins past the plungers, and the pins are moved outwardly by their springs to release the forms, which drop into the form receptacle.

It is thus evident that the stripper apparatus is entirely automatic except for the feeding of the nipple carrying forms, and that hand stripping and turning is eliminated, the separated nipples and forms being received in separate receptacles. Moreover, floor space is reduced, the labor cost is lowered, and the time for stripping is decreased.

While I have described a specific embodiment of my invention, it is obvious that the principles of my invention may be applied to other stripping requirements by suitably changing the shape, material, and relative movement and coaction of the parts, without, however, departing from the spirit and the scope of the invention as defined in the appended claims.

I claim:

1. In combination, a housing, a recess therein adapted to receive a form carrying an article made of resilient material, means movable through the sides of said recess for releasably gripping the form, and means for supplying a gaseous medium under pressure between the form and the article to remove the article from the form.

2. In combination, a housing, a recess therein adapted to receive a hollow form carrying an article made of resilient material, means movable through the sides of said recess for releasably gripping the form, and means for supplying a gaseous medium under pressure through the hollow form and between the form and the article to remove the article from the form.

3. In combination, a rotatable housing, a recess therein adapted to receive a form carrying an article made of resilient material, means movable through the sides of said recess for releasably gripping the form, means for supplying a gaseous medium under pressure between the form and the article to remove the article from the form, and means dependent on rotation of the housing for releasing the form from the gripping means.

4. In combination, a housing, a recess therein adapted to receive a form carrying an article made of resilient material, the form having a skirt, means movable through the sides of said recess for releasably gripping the skirt, means for supplying air under pressure between the form and the article, and means dependent on rotation of the housing for releasing the form from the gripping means.

5. In combination, a rotatable housing, a recess therein adapted to receive a form carrying an article made of resilient material, the form having a skirt, means movable through the sides of said recess for releasably gripping the skirt, means for supplying air under pressure between the form and the article, and means dependent on rotation of the housing for releasing the form from the gripping means.

6. In combination, a rotatable housing, a plurality of recesses therein each adapted to receive a hollow form having ports therethrough and carrying an article made of resilient material, the form having a skirt, spring pressed means for releasably engaging the form skirts, and means for supplying air under pressure to the interior of the form to blow the article off the form, and means dependent on rotation of the housing for releasing the form from the gripping means.

7. In combination, a rotatable housing, a plurality of recesses therein each adapted to receive a hollow form having ports therethrough and carrying an article made of resilient material, the form having a skirt, spring pressed pins movable for successively releasably engaging the form skirts, and means for supplying air under pressure to the interior of the form to blow the article off the form.

8. In combination, a fixed drum, a rotatable housing mounted thereon and having a plurality of recesses each adapted to receive a hollow form having ports therethrough and carrying an article made of resilient material, said recesses having open inner ends, and said hub having a radial duct for supplying air under pressure and means for releasably gripping said form during the interval the open ends of the recesses become aligned with said drum duct.

9. In combination, a fixed drum, a rotatable housing mounted thereon and having a plurality of recesses each adapted to receive a hollow form having ports therethrough and carrying an article made of resilient material, said recesses having open inner ends, and said hub having a radial duct for supplying air under pressure, and means for releasably gripping said form during the interval the open ends of the recesses become aligned with said drum duct, said means including spring pressed pins engageable with the form and cam abutments for periodically actuating said pins towards the form.

10. In combination, a housing, a recess therein adapted to receive a hollow form perforated at a plurality of spaced points and carrying an article made of resilient material, means movable through the sides of said recess for releasably gripping the form, and means for supplying a gaseous medium under pressure to pass through the hollow form and the perforations and between the form and the article.

11. In combination, a rotatable housing, a recess therein adapted to receive a form carrying an article made of resilient material, means for releasably gripping the form, means for supplying a gaseous medium under pressure between the form and the article to remove the article from the form, and means dependent on rotation of the housing for releasing the form from the gripping means.

12. In combination, a rotatable housing, a recess therein adapted to receive a form carrying an article made of resilient material, the form having a skirt, means for releasably gripping the skirt, means for supplying air under pressure between the form and the article, and means dependent on rotation of the housing for releasing the form from the gripping means.

13. In combination, a housing, a recess therein adapted to receive a skirted perforated form carrying an article made of resilient material, means movable into the said recess for releasably gripping the skirt, and means for supplying air under pressure to said recess to pass through said perforations and between the form and the article.

PAUL A. RAICHE.